United States Patent
Orue Orue et al.

(10) Patent No.: US 8,332,980 B2
(45) Date of Patent: Dec. 18, 2012

(54) WASHING HOUSEHOLD APPLIANCE AND CONTROL METHOD THEREOF

(75) Inventors: Rodrigo Orue Orue, Elorrio (ES); Javier Valentin Errasti Uriarte, Eskoriatza (ES); Fernando Sales Villalabeitia, Mondragon (ES)

(73) Assignee: Coprecitec, S.L., Avda. Alava, Aretxabaleta (ES)

( * ) Notice: Subject to any disclaimer, the term of this patent is extended or adjusted under 35 U.S.C. 154(b) by 200 days.

(21) Appl. No.: 12/772,994

(22) Filed: May 3, 2010

(65) Prior Publication Data

US 2010/0275953 A1 Nov. 4, 2010

(30) Foreign Application Priority Data

May 4, 2009 (EP) .................................. 09159343

(51) Int. Cl.
*D06F 35/00* (2006.01)
*D06F 33/00* (2006.01)
*B08B 3/12* (2006.01)

(52) U.S. Cl. ............ 8/158; 68/12.02; 68/12.19; 68/208; 134/186

(58) Field of Classification Search ........................ None
See application file for complete search history.

(56) References Cited

U.S. PATENT DOCUMENTS

| | | | | |
|---|---|---|---|---|
| 5,563,490 | A * | 10/1996 | Kawaguchi et al. | 318/808 |
| 6,457,944 | B1 * | 10/2002 | Haberlander et al. | 417/44.1 |
| 2004/0078902 | A1 | 4/2004 | McGill et al. | |

FOREIGN PATENT DOCUMENTS

| | | |
|---|---|---|
| EP | 0226858 A1 | 11/1986 |
| EP | 0287984 B1 | 10/1993 |
| EP | 1016786 B1 | 2/2003 |
| EP | 1783264 A2 * | 5/2007 |
| EP | 1942219 A1 | 7/2008 |
| ES | 2162544 | 12/2001 |

OTHER PUBLICATIONS

Extended European Search Report, European Patent Office, EP 09159343.4, Oct. 8, 2009.

* cited by examiner

*Primary Examiner* — Michael Kornakov
*Assistant Examiner* — Nicole Blan
(74) *Attorney, Agent, or Firm* — Tim L. Kitchen; Peter B. Scull; Hamilton DeSanctis & Cha, LLP (57) ABSTRACT

An appliance having a drain pump with a motor adapted to be supplied with an alternating supply voltage. A controller is adapted to monitor a current value supplied to the motor and to control the frequency of the supply voltage among a plurality of predetermined frequencies when the drain pump is operated in a full drainage mode. A storage medium associated with the controller stores for each predetermined frequency a maximum current value, a minimum current value and an optimal current value. The controller may stores computer implemented instructions for (a) determining if the monitored current value is between the maximum current value and the minimum current value, (b) comparing the monitored current value with the optimal current value, and (c) adjusting the frequency of the alternating supply voltage among the plurality of predetermined frequencies to cause the monitored current to more closely match the optimal current value.

19 Claims, 6 Drawing Sheets

WASHING HOUSEHOLD APPLIANCE AND CONTROL METHOD THEREOF

CROSS-REFERENCE TO RELATED APPLICATIONS

The present application relates to and claims priority to European Patent Application No. 09159343.4, filed May 4, 2009.

FIELD

The invention relates to appliances having a drainage pump and to methods for controlling the supply voltage delivered to the drainage pump.

BACKGROUND

Washing household appliances such as dishwashers and/or washing machines comprise a water circulation pump unit to recirculate the water during the washing processes, and a drainage pump unit to drain water during a drainage process, which normally rotates at a specific speed of rotation and for a specific time.

Drainage pump units comprise an impeller and, generally, a permanent-magnet synchronous motor to allow the impeller to rotate at a determined speed of rotation and thereby drain the water, as is the case, for example, of those disclosed in patent documents EP 287984 B1 and ES 2162544 B1. Synchronous motors are connected to the mains supply, and comprise a determined network frequency, the speed of rotation of the impeller depending on the network frequency which is normally substantially constant. The drainage flow depends on the speed of rotation of the impeller and therefore on the frequency applied to the synchronous motor.

Washing household appliances can also comprise control means for controlling the supply to the drainage pump unit, which allow the units to activate at a specific time and which deactivate following a specific time interval, when the programme cycle has finished or when it is deemed convenient. This may be set beforehand depending on the washing program to be used, for example, and the control means have the function of activating the pump unit to begin the drainage process during which the drainage pump unit allows the drainage of the water, and of deactivating the unit to finish the drainage process. As a result, the drainage processes require that the drainage pump unit is active for a preset time at the preset frequency, without taking into consideration parameters that may optimise or improve the efficiency of the processes or which may even improve the reliability of the drainage pump units. This may result in a premature fault in the drainage pump unit, and due to the tendency to concentrate components in washing appliances it may become increasingly difficult to replace the unit.

There are known washing household appliances that overcome this drawback by providing the pump unit with more generous dimensions that increase pump capacity and decrease activation time of the pump. A problem with this solution is that it results in increased manufacturing costs and adversely affects the ability to scale the dimensions of the appliance in which the drain pump is incorporated. Some washing household appliances comprise control means to resolve these drawbacks, thereby avoiding the need for a provision of more generous dimensions, the control means being adapted to control the supply to the drainage pump unit not only to start and end the drainage process, but also to control the supply during the drainage process.

Document EP1942219A1, for example, discloses a washing household appliance of this type. The control means comprised in the appliance may allow the drainage pump unit to activate and/or deactivate during the drainage process. The household appliance thus comprises level sensors to detect the level of the water, and the control means may determine the level in accordance with the detection of the level sensor. The control means thus allow, during the drainage process, the drainage pump unit to activate at a specific frequency or to deactivate the pump unit, in accordance with the detected level, thereby creating a more effective process and also increasing the reliability of the drainage pump unit as it is active for less time in each drainage process.

In some washing household appliances a variable-frequency drainage pump unit is used and which comprises an impeller and a BLDC type motor to allow the rotation of the impeller. Document EP1783264A2, for example, discloses an appliance that comprises a motor of this type, and also discloses a control method for improving control over the drainage pump unit. The consumption current of the motor is determined, and the current is linked to a water level. The frequency of the motor supply voltage is changed to vary the flow of drainage water in accordance with the associated water level. As a result, the control means also compare the associated level with a preset level.

SUMMARY

It is an object of the invention to provide a drainage pump unit offering improved reliability in a simple and economical way. Another objective of the invention is to provide a control method for a drainage pump.

It is an object of the invention to provide a washing household appliance that comprises a drainage pump unit offering improved reliability in a simple and economical way. Another objective of the invention is to provide a control method for a washing household appliance.

One aspect of the invention relates to a washing household appliance that comprises a drainage pump unit with an impeller and a motor supplied with an alternating supply voltage of a frequency selected from several preset frequencies, and control means adapted for monitoring the current of the motor and for controlling the motor in accordance with the current, regulating the frequency of the motor between the plurality of preset frequencies. Another aspect of the invention relates to a control method for the washing appliance.

In one implementation the washing household appliance of the invention also comprises storage means where, for each of the possible preset frequencies, the following are stored: an optimal consumption current of the motor that corresponds with the consumption current of the motor which guarantees a full-flow drainage process is completed correctly, during which a minimum drainage flow is guaranteed; a maximum consumption current of the motor allowed during the full-flow drainage process; and a minimum consumption current of the motor allowed during the full-flow drainage process. In one implementation the control means determines whether the monitored current is within a range of currents delimited by the maximum and minimum currents, and, if this is the case, a comparison of the current with the corresponding optimal current is made. In accordance with the comparison, the control means regulates the frequency of the motor supply voltage so that the current of the motor is as close as possible or is substantially equal to the optimal current, from the preset frequencies.

As a result, a more optimal and reliable use of the pump unit may be achieved as the unit is able to provide a correct full-flow drainage process with a frequency that provides optimal current consumption (the minimum required to ensure the installation conditions of the household appliance and guarantee its correct operation). As a result, the pump unit operates under less strain in most cases, as far away as possible from the current limit values. This may also be achieved in a direct and simple way by comparing values obtained directly from a measurement (current) with other values of the same type (currents), with the prior storage of a very small amount of information also being required.

These and other advantages and characteristics of the invention will be made evident in the light of the drawings and the detailed description thereof.

DETAILED DESCRIPTION

Figure 1:
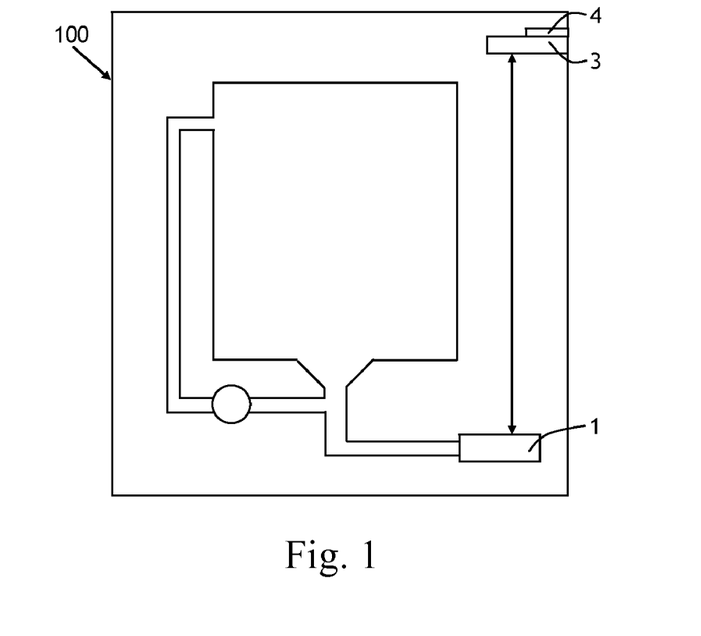
FIG. 1 schematically shows a washing household appliance in one implementation.

FIG. 1 schematically shows a washing household appliance 100 in accordance with one implementation of the present invention, which in this case corresponds with a dishwasher but which may also correspond, for example, with a washing machine or a host of other appliances employing the use of a motor driven drainage pump. The appliance 100 comprises a drainage pump unit 1 to drain the water from its interior, which comprises an impeller and a motor that allows the rotation of the impeller at a speed of rotation Vg to start the drainage, and control means 3 to monitor a consumption current Iq of the motor and to control the motor in accordance with the monitored current Iq. The control means 3 may comprise, for example a microprocessor, a controller, an FPGA or an equivalent device.

The motor is supplied by a variable alternating supply voltage with a determined frequency F, and thus allows the rotation of the impeller at a speed of rotation Vg determined by the number of poles of the motor, in accordance with the following equation:

$$Vg = F * \frac{60}{P}.$$

Where:
Vg: speed of rotation of the impeller,
F: frequency of the motor supply voltage, and
P: number of pairs of poles of the motor.

The speed of rotation Vg depends on the frequency F of the motor supply voltage, and by regulating the frequency F the speed of rotation Vg is also regulated, thus enabling the regulation of the operating conditions of the pump unit 1 in the installation in which it is disposed.

The pump unit 1 may carry out different drainage processes. One may be, for example, a specific process that occurs in the spin cycle of a washing machine, during the course of which the flow Q of water that is drained off gradually reduces as the specific drainage process advances due to the reduction of the water in the appliance and not to the speed of rotation of the impeller. In another drainage process, known as a full-flow drainage process, the flow Q of water that is drained off is kept constant unless the speed of rotation of the impeller is altered as a result of a change in the frequency F of the motor supply voltage. The present invention is directed to a full-flow drainage process.

For the full-flow drainage process the manufacturer defines or presets a plurality of possible frequencies F for the motor supply voltage, limited by a maximum possible frequency Fmax and a minimum frequency Fmin. The maximum and minimum frequencies Fmax and Fmin are selected in accordance with hydraulic and mechanical factors so as not to strain the pump unit 1. The preset frequencies F are therefore within a delimited range between the maximum and minimum frequencies Fmax and Fmin, the maximum and minimum frequencies Fmax and Fmin being included between the preset frequencies F. By way of example, the maximum and minimum frequencies Fmax and Fmin may be 60 Hz and 30 Hz respectively, and five intermediate frequencies F of 35, 40, 45, 50 and 55 Hz may be preset. This example is not restrictive, as other frequency F values may be selected, and a different number of intermediate frequencies F. The appliance 100 also comprises storage means 4, which correspond with a memory that may be integrated into the control means 3 or which may comprise a member external to the control means 3 (an EEPROM, for example), where the preset frequencies F may be stored, so that the control means 3 may regulate the frequency F, assigning only preset values to it (those stored in the storage means).

Figure 2:
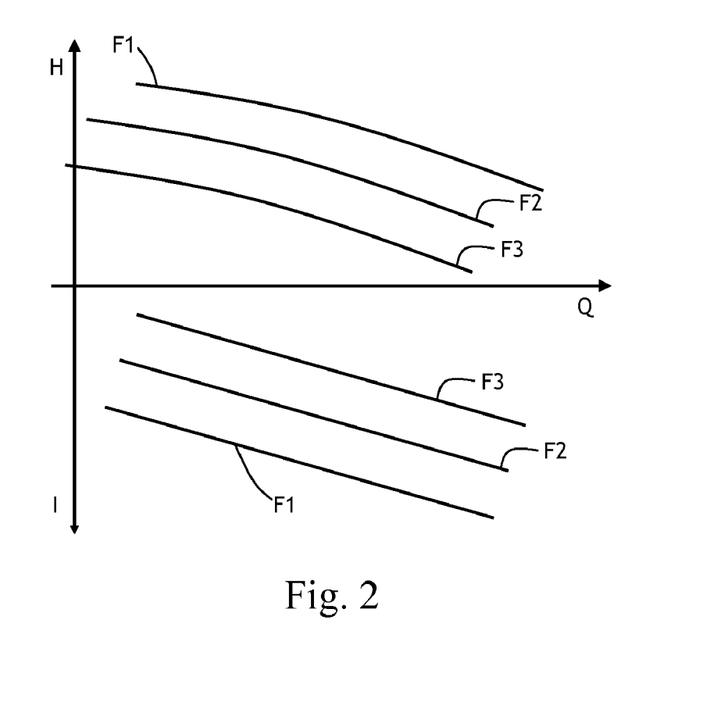
FIG. 2 shows exemplary characteristic curves of a drainage pump unit.

In one implementation the motor is a BLDC type motor and the current Iq of the motor, which is monitored by the control means 3, is determined by an appropriate control for that purpose, which may be integrated into the control means 3, which is known and used in this type of motors and which allows the current I of the motor (monitored current Iq by the control means 3) to be associated to the frequency F of the motor supply voltage. For a determined frequency F the current in the motor produces a torque that allows the rotation of the impeller, thereby providing a specific drainage flow Q, and in one implementation the appropriate control adapts the current consumption I, Iq of the motor to always create a flow with the minimum possible current consumption. Thus, the manufacturer may preset or define a pump unit 1 for the appliance 100, whose characteristics are represented in FIG. 2. The FIG. 2 shows the characteristics of the pump unit 1, which associate the current I consumption of the motor to its supply frequency F (frequencies F1, F2 and F3 in this case) and the characteristics of the installation (manometric height H and flow Q).

Figure 3:
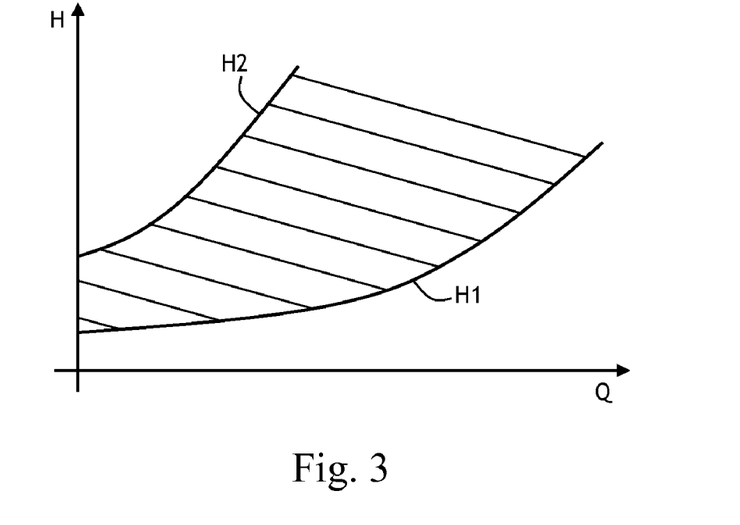
FIG. 3 shows an exemplary working area of a drainage pump unit.

The manufacturer also presets or defines some limit parameters for the installation of the appliance 100 and within which the pump unit 1 must operate. FIG. 3 shows an example of such limits in the form of installation curves H1 and H2 that represent, for a given appliance 100 and taking into consideration the different installation options (type of drainage pipe, the diameter and length of the pipe), the minimum and maximum height respectively at which a drainage point may be disposed for the installation. These installation curves H1 and H2 link the drainage flow Q of the pump unit 1 (x-axis) with the manometric height H (pressure, v-axis) that the pump unit 1 generates in the corresponding installation, the pump unit being designed to operate between both curves H1 and H2.

Figure 4:
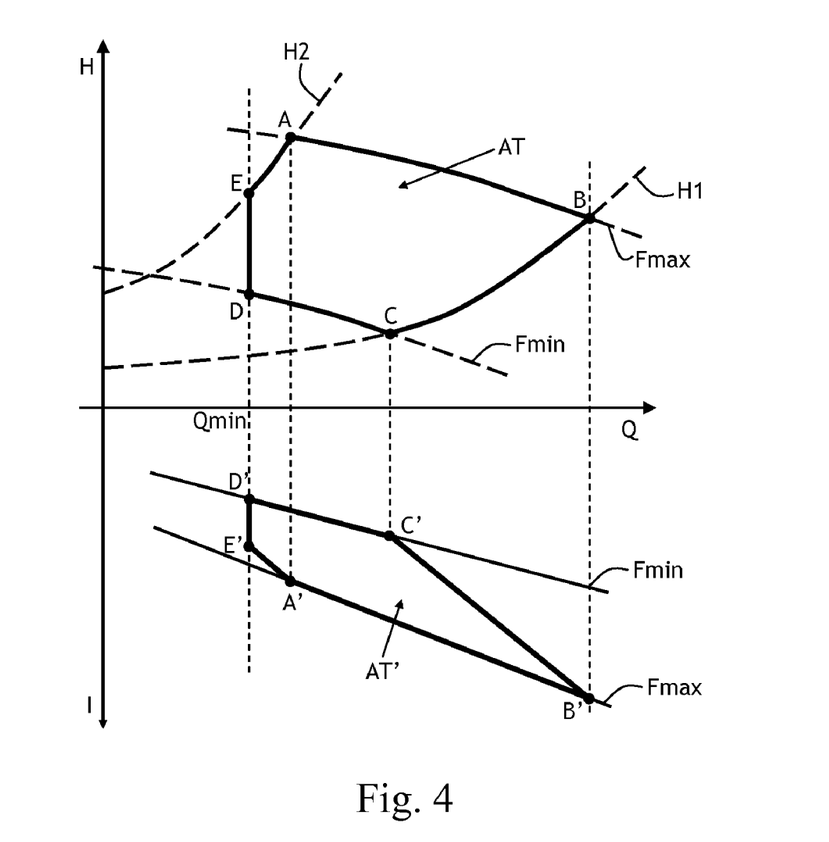
FIG. 4 shows an exemplary working area of a drainage pump unit for a full-flow drainage process.

The manufacturer also presets or defines a minimum flow Qmin that must be guaranteed for any possible installation of the appliance 100, to provide a correct full-flow drainage process. FIG. 4 shows an example of a working area AT of the pump unit 1 for the full-flow drainage process, which is delimited by the installation curves H1 and H2, by the maximum and minimum frequencies Fmax and Fmin allowed for the motor supply voltage, and by the minimum flow Qmin (which is represented with a straight line in the FIG. 4). When the pump unit 1 is operating in the working area AT, it meets the necessary requirements for providing a correct full-flow drainage process: it ensures the minimum flow Qmin by operating within the preset limits of frequency Fmax and Fmin. In the graph linking the manometric height H with the flow Q, the working area AT is delimited by the points A, B, C, D and E, whereas in the graph linking the flow Q with the current I of the motor the working area AT' is delimited by the points A', B', C', D' and E', which correspond respectively with the points A, B, C, D and E of the graph linking the manometric height H with the flow Q.

A minimum current consumption Imin for each frequency F (air-water limit) is set for drainage processes different to the full-flow process, the control means 3 determining that it is a different drainage process to the full-flow process when the monitored current Iq is below the air-water limit. The control means 3 thus determine that the full-flow drainage process is being performed when the monitored current Iq of the motor is between the corresponding minimum current Imin and a maximum preset current Imax. To ensure that the control means 3 can determine whether it is a full-flow drainage process or not, the maximum current Imax and the minimum current Imin for each frequency F are stored in the storage means 4, so that the control means 3 may compare the monitored current Iq of the motor with the maximum and minimum currents Imax and Imin.

In accordance with one aspect of the present invention it is an aim that the pump unit 1 operate under as little strain as allowed in the installation in the full-flow drainage process, so that once it is determined that a full-flow drainage process is being performed, the control means 3 allow the pump unit 1 to operate under as little strain as possible. To operate under as little strain as possible means to operate at frequencies and/or currents that are as far as possible from the Imax and Fmax limits that ensure a minimum flow Qmin. This is achieved by allowing the pump unit 1 to operate on the C', D', E' line shown in the example of FIG. 4, which corresponds with the situation in which the drainage flow Q is substantially equal to the required minimum flow Qmin (line D'-E') or to the situation in which the frequency F of the motor supply voltage is equal to the permitted minimum frequency Fmin (line C'-D'). These lines correspond with a specific operating condition that can easily be reproduced, as a result of which the manufacturer may associate previously and for each frequency F, an optimal current Iop in accordance with various possible installations. In some cases the optimal current Iop corresponds with a current I of the motor that is associated to the preset minimum flow Qmin (line D'-E') and in other cases it corresponds with the preset minimum frequency Fmin.

Thus, the optimal current Iop is generally the smallest possible current of the motor that ensures the required function of the pump unit 1 in the full-flow drainage process, so that the pump unit 1 operates under as little strain as possible and with a frequency F of the motor supply voltage that is as low as possible, the optimal current Iop being the objective or setting current for the motor. In one implementation an optimal current Iop of the motor that is set previously for each preset frequency F of the motor supply voltage is stored in storage means 4, the control means 3 being capable of determining whether the monitored current Iq is substantially equal to the corresponding optimal current Iop or not.

Figure 5:
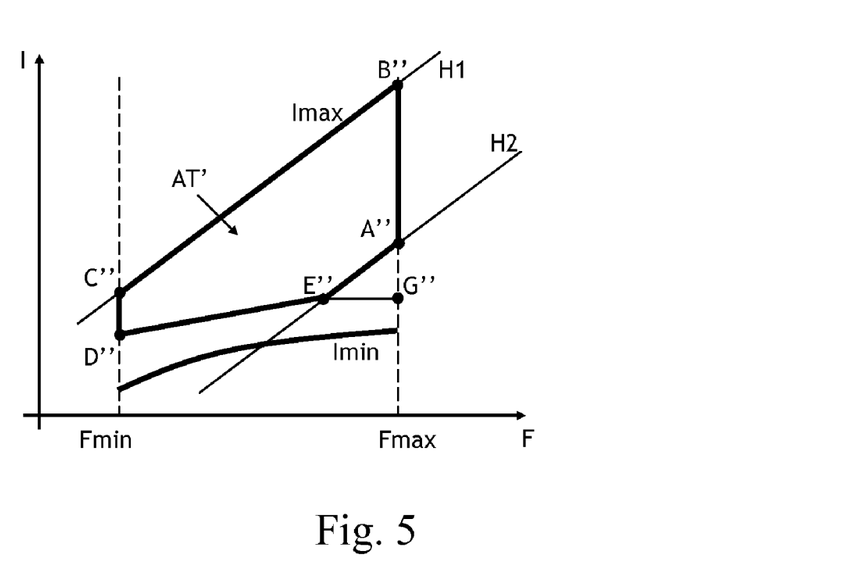
FIG. 5 shows an exemplary working area in a graph that links the current and the frequency of the motor of the pump unit.

FIG. 5 shows the working area AT' of FIG. 4 transformed at a ratio between the current I of the motor and the frequency F of the supply voltage of the motor, and also shows the limit fixed by the minimum current Imin for the full-flow drainage process (air-water limit). The limit Imin shown is not restrictive, and may comprise different shapes to the curved line shown in FIG. 5. The points A'', B'', C'', D'' and E'' correspond with the points A', B', C', D' and E' of FIG. 4 respectively, and the optimal current Iop corresponds with the D''-E-G'' (the line E''-G'' is outside the delimited range between the installation curves H1 and H2).

In one implementation the control means 3 of appliance 100 supplies the motor with a suitable voltage of a frequency F comprised between the maximum and minimum frequencies Fmax and Fmin (or even at a frequency F equal to the maximum or minimum frequency Fmax or Fmin) and determines whether the monitored current Iq of the motor is within a range of currents delimited by the maximum and minimum currents Imax and Imin, to determine whether it is a full-flow drainage process or not. If a full-flow drainage process is determined (monitored current Iq inside the range), the control means 3 compares the monitored current Iq with the optimal current Iop corresponding to the current frequency F of the motor supply voltage stored in the storage means 4, and, in accordance with the result of the comparison, regulates the frequency F so that the monitored current Iq more closely matches or is substantially equal to the optimal current Iop or is as close as possible to the optimal current Iop. If the monitored current Iq is greater than the optimal current Iop, the control means 3 causes a reduction of the frequency F until a current I is substantially equal to the optimal current Iop (or as close as possible to the optimal current Iop). If monitored current Iq is smaller than the optimal current Iop, the control means 3 causes an increase in the frequency F until a current I more closely matches the optimal current, and preferably is substantially equal to the optimal current Iop or as close as possible to the optimal current Iop. If the control means 3 determines that the monitored current Iq is substantially equal to the optimal current Iop, the frequency F is maintained. As a result, in an appliance 100 of the present invention only three items of data need to be stored in the storage means 4 for each preset frequency F to ensure that the pump unit 1 operates under less strain. These are:

1) The allowed maximum current Imax for the motor in the full-flow drainage process,
2) The allowed minimum current Imin for the motor in the full-flow drainage process, and
3) The optimal current Iop defined to allow the motor to operate under as little strain as possible in a full-flow drainage process, within the set working area AT'.

Figure 6:
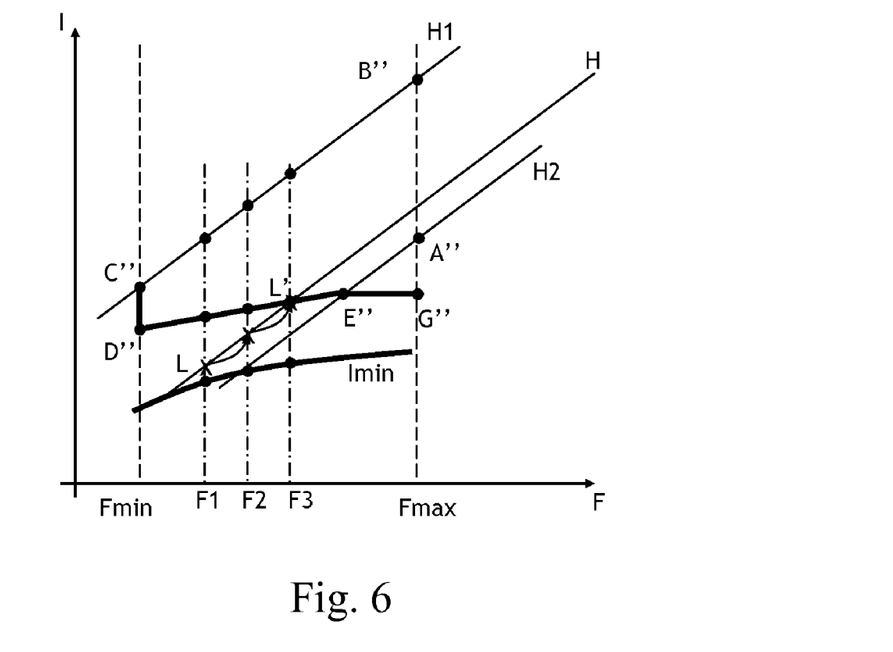
FIG. 6 shows a first example for controlling the motor of a drainage pump in accordance with one implementation.
Figure 7:
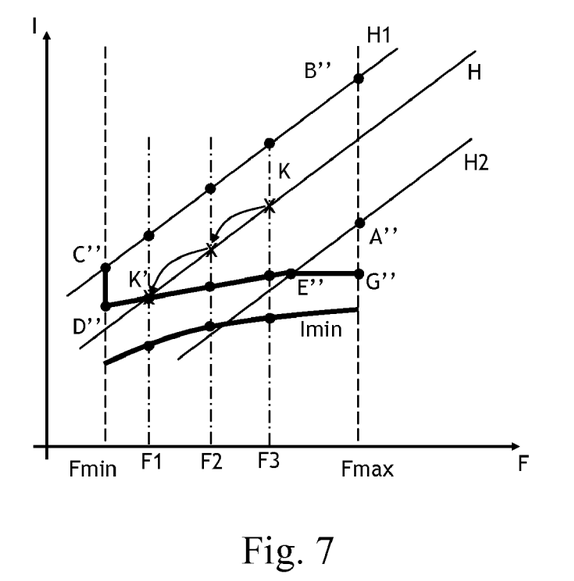
FIG. 7 shows a second example for controlling the motor of a drainage pump in accordance with one implementation.
Figure 8:
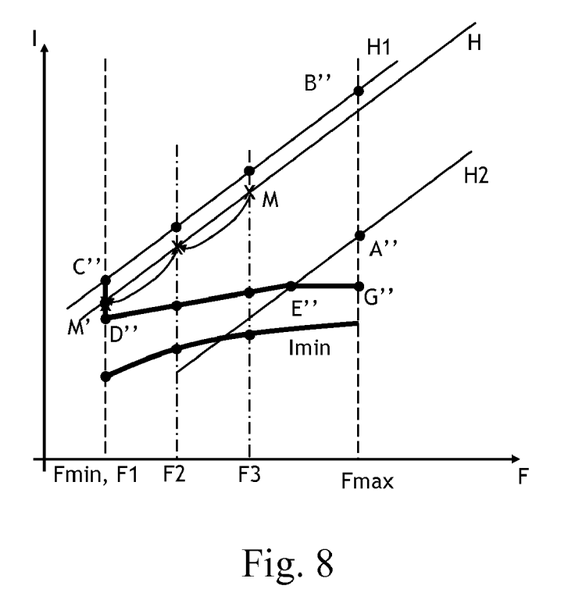
FIG. 8 shows a third example for controlling the motor of a drainage pump in accordance with one implementation.

FIGS. 6, 7 and 8 show three examples of the way in which the control means 3 acts in a full-flow drainage process for an installation curve H given by way of example in each case.

FIGS. 6 to 8 show a plurality of preset frequencies F1, F2 and F3 for the motor supply voltage, the working area AT' and a line corresponding with the allowed minimum current Imin in the motor for the full-flow drainage process. For each frequency F1, F2 and F3 the three values stored in the storage means 4 are shown by means of black circular dots: maximum current Imax (corresponds with the curve H1), minimum current Imin (with the curve Imin) and optimal current Iop (with the line D"-E-G").

In the first example shown in FIG. 6, the motor is supplied with a supply voltage with a preset frequency F1. The control means determine that the monitored current Iq (point L) of the motor at that frequency F1 is smaller than the optimal current Iop preset for the frequency F1 (a point of the line D"-E" in this case), and increases the frequency F of the supply voltage to a frequency F2. At the frequency F2 the control means 3 determines that the monitored current Iq (represented by an X) continues to be smaller than the optimal current Iop preset for the frequency F2 (a point of the line D"-E" in this case), and increases the frequency F up to a frequency F3. At the frequency F3 the control means 3 determines that the monitored current Iq (point L') is substantially equal to the optimal current Iop preset for the frequency F3 and maintains the frequency F3 of the supply voltage until the full-flow drainage function is completed. In one implementation, once the frequency F3 has been set, the control means 3 continues checking on a cyclical basis if the current of the motor is kept substantially equal to the optimal current Iop, which occurs for as long as the full-flow phase lasts. When the water has finished and the monitored current Iq is less than the minimum current Imin (air-water limit) the control means 3 detects the situation and acts accordingly.

In the second example shown in FIG. 7, the motor is supplied with a supply voltage with a preset frequency F3. The control means 3 determines that the monitored current Iq (point K) of the motor at that frequency F3 is greater than the optimal current preset for the frequency F3 (a point of the line D"-E" in this case), and reduces the frequency of the supply voltage up to a frequency F2. At the frequency F2 the control means 3 determines that the monitored current Iq (represented by an X) continues to be greater than the optimal current Iop preset for the frequency F2 (a point of the line D"-E" in this case) and reduces the frequency F of the supply voltage to a frequency F1. At the frequency F1 the control means 3 determines that the monitored current Iq (point K') is substantially equal to the optimal current Iop preset for the frequency F1 and maintains the frequency F1 of the supply voltage until the full-flow drainage function is completed. In one implementation, once the frequency F1 has been set, the control means 3 continues checking on a cyclical basis if the monitored current Iq of the motor is kept substantially equal to the optimal current Iop, which occurs for as long as the full-flow drainage process lasts. When the water has finished and the monitored current Iq is less than the minimum current Imin (air-water limit) the control means 3 detects the situation and acts accordingly.

In the third example shown in FIG. 8, the motor is supplied with a supply voltage with a preset frequency F3. The control means 3 determines that the monitored current Iq (point M) of the motor at that frequency F3 is greater than the optimal current preset for the frequency F3 (a point of the line D"-E" in this case), and reduces the frequency of the supply voltage to a frequency F2. At the frequency F2 the control means 3 determines that the monitored current Iq (represented by an X) continues to be greater than the optimal current Iop preset for the frequency F2, and reduces the frequency F of the supply voltage to a frequency F1. As the frequency F1 corresponds with the minimum frequency Fmin, the control means 3 determines that the frequency F cannot continue to fall and maintains the operating point at M' with a current Iq greater than the optimal current Iop corresponding with the minimum frequency Fmin, until the full-flow drainage process is completed. When the water has finished and the monitored current Iq is smaller than the minimum current Imin (air-water limit) the control means 3 detects the situation and acts accordingly.

In one implementation a control means of an appliance acts in the following way in response to possible cases:
  a) If the monitored current Iq of the motor is less than the minimum current Imin, the control means 3 determines that the appliance is not in a full-flow drainage process and performs the pertinent functions for the corresponding process.
  b) If the monitored current Iq of the motor is between the minimum current Imin and the maximum current Imax and is smaller than the optimal current Iop, the control means 3 increases the frequency F of the motor supply voltage as a result of determining the full-flow drainage process is not being performed correctly.
  c) If the monitored current Iq of the motor is substantially equal to the corresponding optimal current Iop, the control means 3 maintain the frequency F of the supply voltage of the motor.
  d) If the monitored current Iq of the motor is between the minimum current Imin and the maximum current Imax and is greater than the optimal current Iop, the control means 3 reduce the frequency F of the motor supply voltage as a result of determining that the pump unit 1 can operate under less strain.
  e) If the monitored current Iq of the motor is greater than the maximum current Imax, the control means 3 determine that the pump unit 1 is working outside the working area AT, in an undesirable area, and acts accordingly.

Figure 9:
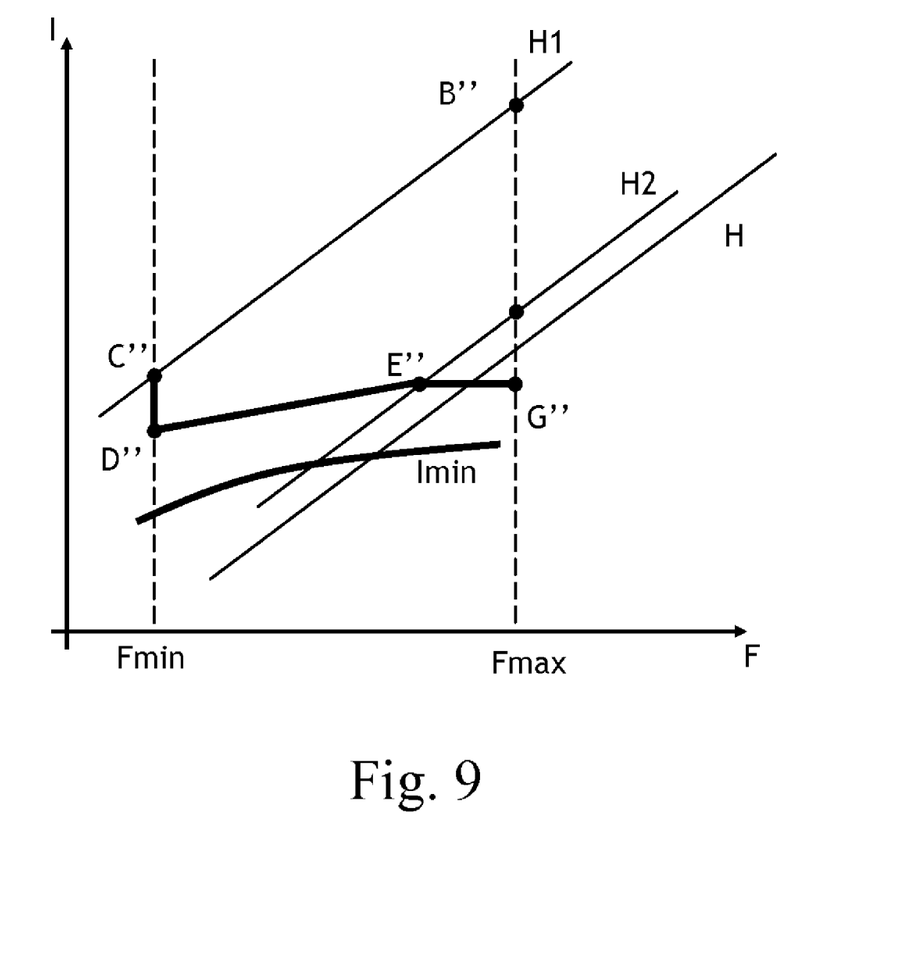
FIG. 9 shows an example for controlling the motor of a drainage pump in which the motor is allowed to operate in a range outside the limits set by the installation curves H1 and H2.

In some cases the pump unit 1 may be allowed to operate in a range outside the limits set by the installation curves H1 and H2, cases in which the appliance 100 operates as if it were inside the ranges (the example in FIG. 9). For this case, the optimal current Iop corresponds with the line D"-E"-G".

Figure 10:
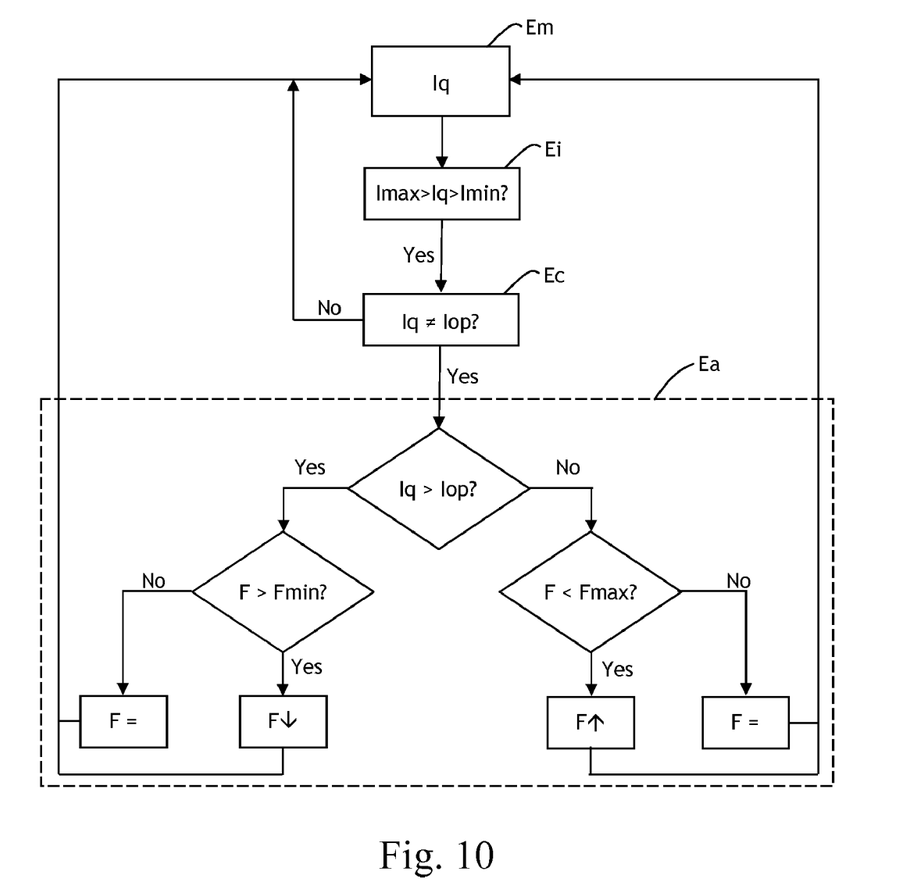
FIG. 10 shows a flow chart of a control method in accordance with one implementation of the present invention.

A control method for performing a full-flow drainage process in a washing household appliance 100 in one implementation is illustrated in the flow diagram of FIG. 10. In the exemplary method of FIG. 10 the control means 3 monitors the current Iq of the motor in a monitoring phase Em and determines if the current Iq is between the corresponding current Imax and the corresponding current Imin in an intermediate phase Ei. If the current Iq is between Imax and Imin, the control means 3 compares the current Iq with the optimal current Iop in a comparison phase Ec and regulates the frequency F of the motor supply voltage in an adjustment phase Ea in a manner previously described.

In one implementation the appliance 100 also comprises means (not shown in the figures) for detecting the temperature of the motor, the control means 3 compensating the monitored current Iq in accordance with the temperature detected, a compensated current thus being obtained. The control means 3 use the compensated current in the intermediate phase Ei, in the comparison phase Ec and in the adjustment phase Ea, instead of the monitored current Iq. The compensated current may be determined in a conventional manner.

What is claimed is:
1. An appliance comprising
  a drain pump having an impeller and a motor supplied with an alternating supply voltage that drives the impeller,
  a controller adapted to monitoring a current value supplied to the motor and to control the frequency of the supply voltage among a plurality of predetermined frequencies when the drain pump is operated in a full drainage mode, a storage medium associated with the controller that stores for each predetermined frequency a maximum current value, a minimum current value and an optimal current value; and the controller storing computer implemented instructions that when executed (a) determines if the monitored current value is between the maximum current value and the minimum current value, (b) upon determining that the monitored current value is between the maximum current value and the minimum current value compares the monitored current value with the optimal current value, and (c) adjusts the frequency of the alternating supply voltage among the plurality of predetermined frequencies to cause the monitored current to more closely match the optimal current value.

2. An appliance according to claim 1, wherein for a full-flow drainage process the motor is designed to operate at multiple alternating supply voltage frequencies including a minimum alternating supply voltage frequency, the optimal current value corresponding to the minimum alternating supply voltage frequency.

3. An appliance according to claim 1, wherein for a full-flow drainage process the motor is designed to produce a minimum flow, the optimal current value corresponding to the minimum flow.

4. An appliance according to claim 1, wherein for a full-flow drainage process the motor is designed to operate at multiple alternating supply voltage frequencies including a minimum alternating supply voltage frequency and wherein the controller stores executable instructions that when executed cause a reduction in the frequency of the alternating supply voltage among the plurality of predetermined frequencies when the monitored current value is detected by the controller to be greater than the optimal current value and when the frequency of the alternating supply voltage is greater than the minimum frequency.

5. An appliance according to claim 1, wherein for a full-flow drainage process the motor is designed to operate at multiple alternating supply voltage frequencies including a minimum alternating supply voltage frequency and wherein the controller stores executable instructions that when executed causes the frequency of the motor alternating supply voltage to remain at a predetermined frequency when the monitored current value is detected by the controller to be greater than the optimal current value and the predetermined frequency is equal to the minimum frequency.

6. An appliance according to claim 1, wherein for a full-flow drainage process the motor is designed to operate at a maximum alternating supply voltage frequency, the controller storing executable instructions that when executed causes an increase in the frequency among the plurality of predetermined frequencies when the monitored current value is detected by the controller to be less than the optimal current value and when the frequency of the alternating supply voltage is less than the maximum frequency.

7. An appliance according to claim 1, wherein for a full-flow drainage process the motor is designed to operate at a maximum alternating supply voltage frequency, the controller storing executable instructions that when executed causes the frequency of the motor alternating supply voltage to remain at a predetermined frequency when the monitored current value detected by the controller to be less than the optimal current value and the predetermined frequency is equal to the maximum frequency.

8. An appliance according to claim 1, further comprising a temperature sensor that detects a temperature of the motor, an output of the temperature sensor coupled to the controller, the controller storing executable instructions that when executed adjusts the monitored current value in response to the monitored temperature and compares the adjusted monitored current value with the optimal current value and regulates the frequency of the motor alternating supply voltage accordingly.

9. An appliance according to claim 1, wherein the appliance is a dishwasher.

10. An appliance according to claim 1, wherein the appliance is a washing machine.

11. An appliance according to claim 1, wherein the motor is a BLDC motor.

12. A method of controlling a motor of a drain pump of an appliance, the motor configured to operate between minimum and maximum alternating supply voltage frequencies and to be supplied with a current between a minimum and maximum current values, the motor configured to operate at an optimal current value, the method comprising:

monitoring the current delivered to the motor and determining if the monitored current value is between the maximum current value and the minimum current value, upon determining that the monitored current value is between the maximum current value and the minimum current value comparing the monitored current value with the optimal current value;

adjusting the frequency of the alternating supply voltage among a plurality of predetermined frequencies to cause the monitored current to more closely match the optimal current value;

the method further comprising reducing the frequency of the alternating supply voltage among the plurality of predetermined frequencies when the monitored current value is greater than the optimal current value and when the frequency of the alternating supply voltage is greater than the minimum frequency.

13. A method according to claim 12, further comprising monitoring a temperature of the motor, adjusting the monitored current value in response to the monitored temperature and comparing the adjusted monitored current value with the optimal current value, and regulating the frequency of the motor alternating supply voltage accordingly.

14. A method of controlling a motor of a drain pump of an appliance, the motor configured to operate between minimum and maximum alternating supply voltage frequencies and to be supplied with a current between a minimum and maximum current values, the motor configured to operate at an optimal current value, the method comprising:

monitoring the current delivered to the motor and determining if the monitored current value is between the maximum current value and the minimum current value, upon determining that the monitored current value is between the maximum current value and the minimum current value comparing the monitored current value with the optimal current value;

adjusting the frequency of the alternating supply voltage among a plurality of predetermined frequencies to cause the monitored current to more closely match the optimal current value;

the method further comprising maintaining the frequency of the motor alternating supply voltage at a predetermined frequency when the monitored current is greater than the optimal current value and the predetermined frequency is equal to the minimum frequency.

15. A method according to claim 14, further comprising monitoring a temperature of the motor, adjusting the monitored current value in response to the monitored temperature and comparing the adjusted monitored current value with the optimal current value, and regulating the frequency of the motor alternating supply voltage accordingly.

16. A method of controlling a motor of a drain pump of an appliance, the motor configured to operate between minimum and maximum alternating supply voltage frequencies and to be supplied with a current between a minimum and maximum current values, the motor configured to operate at an optimal current value, the method comprising:

monitoring the current delivered to the motor and determining if the monitored current value is between the maximum current value and the minimum current value, upon determining that the monitored current value is between the maximum current value and the minimum current value comparing the monitored current value with the optimal current value;

adjusting the frequency of the alternating supply voltage among a plurality of predetermined frequencies to cause the monitored current to more closely match the optimal current value;

the method further comprising increasing the frequency of the alternating supply voltage among the plurality of predetermined frequencies when the monitored current value is less than the optimal current value and when the frequency of the alternating supply voltage is less than the maximum frequency.

17. A method according to claim 16, further comprising monitoring a temperature of the motor, adjusting the monitored current value in response to the monitored temperature and comparing the adjusted monitored current value with the optimal current value, and regulating the frequency of the motor alternating supply voltage accordingly.

18. A method of controlling a motor of a drain pump of an appliance, the motor configured to operate between minimum and maximum alternating supply voltage frequencies and to be supplied with a current between a minimum and maximum current values, the motor configured to operate at an optimal current value, the method comprising:

monitoring the current delivered to the motor and determining if the monitored current value is between the maximum current value and the minimum current value, upon determining that the monitored current value is between the maximum current value and the minimum current value comparing the monitored current value with the optimal current value;

adjusting the frequency of the alternating supply voltage among a plurality of predetermined frequencies to cause the monitored current to more closely match the optimal current value;

the method further comprising maintaining the frequency of the alternating supply voltage at a predetermined frequency when the monitored current value is less than the optimal current value and the predetermined frequency is equal to the maximum frequency.

19. A method according to claim 18, further comprising monitoring a temperature of the motor, adjusting the monitored current value in response to the monitored temperature and comparing the adjusted monitored current value with the optimal current value, and regulating the frequency of the motor alternating supply voltage accordingly.

* * * * *